United States Patent
Danzig et al.

(10) Patent No.: US 7,372,872 B2
(45) Date of Patent: May 13, 2008

(54) SYSTEM AND METHOD FOR MONITORING UPSTREAM AND DOWNSTREAM TRANSMISSIONS IN CABLE MODEM SYSTEM

(75) Inventors: Joel Danzig, Alpharetta, GA (US); Paul Burrell, Duluth, GA (US); Shane Tow, Suwanee, GA (US); Robert J. Hebert, Alpharetta, GA (US); David R. Dworkin, Alpharetta, GA (US); Harold R. Whitehead, Suwanee, GA (US); Richard Protus, Atlanta, GA (US); Rennie Gardner, Woodstock, GA (US); Fred Bunn, Roswell, GA (US); David B. Mixson, Canton, GA (US); Vincent Patrick Assini, Woodstock, GA (US); Taruna Tjahjadi, Snellville, GA (US)

(73) Assignee: Broadcom Corporation, Irvine, CA (US)

( * ) Notice: Subject to any disclaimer, the term of this patent is extended or adjusted under 35 U.S.C. 154(b) by 887 days.

(21) Appl. No.: 10/440,502

(22) Filed: May 19, 2003

(65) Prior Publication Data

US 2004/0037217 A1    Feb. 26, 2004

Related U.S. Application Data

(60) Provisional application No. 60/381,378, filed on May 20, 2002.

(51) Int. Cl.
| | |
|---|---|
| *H04J 1/00* | (2006.01) |
| *H04L 12/54* | (2006.01) |
| *H04L 27/06* | (2006.01) |
| *H04L 7/00* | (2006.01) |
| *H04B 7/212* | (2006.01) |
| *G06F 15/173* | (2006.01) |

(52) U.S. Cl. .............. 370/480; 370/347; 370/429; 709/224; 375/343; 375/358

(58) Field of Classification Search ............. 370/208, 370/386, 252, 442, 204, 480, 508, 519; 709/224, 709/228; 725/109, 111, 107, 129; 375/132, 375/343, 142, 358, 222, 354
See application file for complete search history.

(56) References Cited

U.S. PATENT DOCUMENTS

| | | | | |
|---|---|---|---|---|
| 5,173,899 | A | * | 12/1992 | Ballance .................... 370/503 |
| 5,881,132 | A | * | 3/1999 | O'Brien et al. .............. 379/35 |
| 6,459,703 | B1 | * | 10/2002 | Grimwood et al. ......... 370/442 |
| 6,760,316 | B1 | * | 7/2004 | Hebsgaard et al. ......... 370/324 |
| 6,785,564 | B1 | * | 8/2004 | Quigley et al. ............. 455/574 |
| 6,909,715 | B1 | * | 6/2005 | Denney et al. ............. 370/392 |
| 6,965,616 | B1 | * | 11/2005 | Quigley et al. ............. 370/480 |
| 6,985,492 | B1 | * | 1/2006 | Thi et al. .................... 370/429 |
| 7,050,419 | B2 | * | 5/2006 | Azenkot et al. ............ 370/347 |
| 7,085,306 | B1 | * | 8/2006 | Voldman et al. ............ 375/132 |
| 7,106,815 | B2 | * | 9/2006 | Popper et al. .............. 375/346 |

(Continued)

*Primary Examiner*—Wing Chan
*Assistant Examiner*—Prenell Jones
(74) *Attorney, Agent, or Firm*—Sterne, Kessler, Goldstein & Fox PLLC

(57) ABSTRACT

A network monitor includes means for monitoring downstream traffic from a cable modem termination system (CMTS) to a cable modem (CM), means for monitoring upstream traffic from the CM to the CMTS, and means for identifying a data format used by the CMTS and the CM for bi-directional communication.

77 Claims, 4 Drawing Sheets

U.S. PATENT DOCUMENTS

| | | | |
|---|---|---|---|
| 7,126,920 B2 * | 10/2006 | Venkatesulu et al. | 370/241 |
| 7,136,432 B2 * | 11/2006 | Min et al. | 375/326 |
| 7,149,223 B2 * | 12/2006 | Liva et al. | 370/401 |
| 2001/0004768 A1 * | 6/2001 | Hodge et al. | 725/91 |
| 2001/0030975 A1 * | 10/2001 | Limb et al. | 370/465 |
| 2002/0006137 A1 * | 1/2002 | Rabenko et al. | 370/419 |
| 2002/0066110 A1 * | 5/2002 | Cloonan et al. | 725/111 |
| 2002/0097674 A1 * | 7/2002 | Balabhadrapatruni et al. | 370/229 |
| 2002/0108120 A1 * | 8/2002 | Bahraini et al. | 725/109 |
| 2002/0118638 A1 * | 8/2002 | Donahue et al. | 370/229 |
| 2003/0058893 A1 * | 3/2003 | Dworkin et al. | 370/503 |
| 2003/0061623 A1 * | 3/2003 | Denney et al. | 725/125 |
| 2003/0067883 A1 * | 4/2003 | Azenkot et al. | 370/252 |
| 2003/0126255 A1 * | 7/2003 | Rice et al. | 709/224 |
| 2003/0126256 A1 * | 7/2003 | Cruickshank et al. | 709/224 |

* cited by examiner

Overview of SCDMA Receiver Architecture

SYSTEM AND METHOD FOR MONITORING UPSTREAM AND DOWNSTREAM TRANSMISSIONS IN CABLE MODERN SYSTEM

CROSS-REFERENCE TO RELATED APPLICATIONS

This application claims priority to U.S. Provisional Patent Application No. 60/381,378, filed May 20, 2002, entitled SYSTEM AND METHOD FOR MONITORING UPSTREAM AND DOWNSTREAM TRANSMISSIONS IN CABLE MODEM SYSTEM, which is incorporated by reference herein.

BACKGROUND OF THE INVENTION

1. Field of the Invention

The present invention relates to a network monitor, and more particularly, to a bidirectional network monitor/analyzer for use in a modem communications system.

2. Related Art

Cable Modems and Cable Modem Termination Systems that conform to the DOCSIS 2.0 standard (Data Over Cable System Interface Specification 2.0, which is incorporated herein by reference) have been in operation in North America and Europe since the latter part of the 1990's. DOCSIS is an evolving standard and therefore modifications to formats and operation parameters are appropriate and expected as this standard develops. One such addition is the adoption of Synchronous Code Division Multiple Access (SCDMA) as a valid format for data transmission within DOCSIS 2.0. The hardware to support this standard is not currently fully developed. Concurrently, there is a need for system analytical tools that address SCDMA transmissions.

SUMMARY OF THE INVENTION

The present invention is directed to a cable network monitor that substantially obviates one or more of the problems and disadvantages of the related art.

There is provided a network monitor including means for monitoring downstream traffic from a cable modem termination system (CMTS) to a cable modem (CM), means for monitoring upstream traffic from the CM to the CMTS, and means for identifying a data format used by the CMTS and the CM for bi-directional communication.

Additional features and advantages of the invention will be set forth in the description that follows, and in part will be apparent from the description, or may be learned by practice of the invention. The advantages of the invention will be realized and attained by the structure particularly pointed out in the written description and claims, as well as in the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
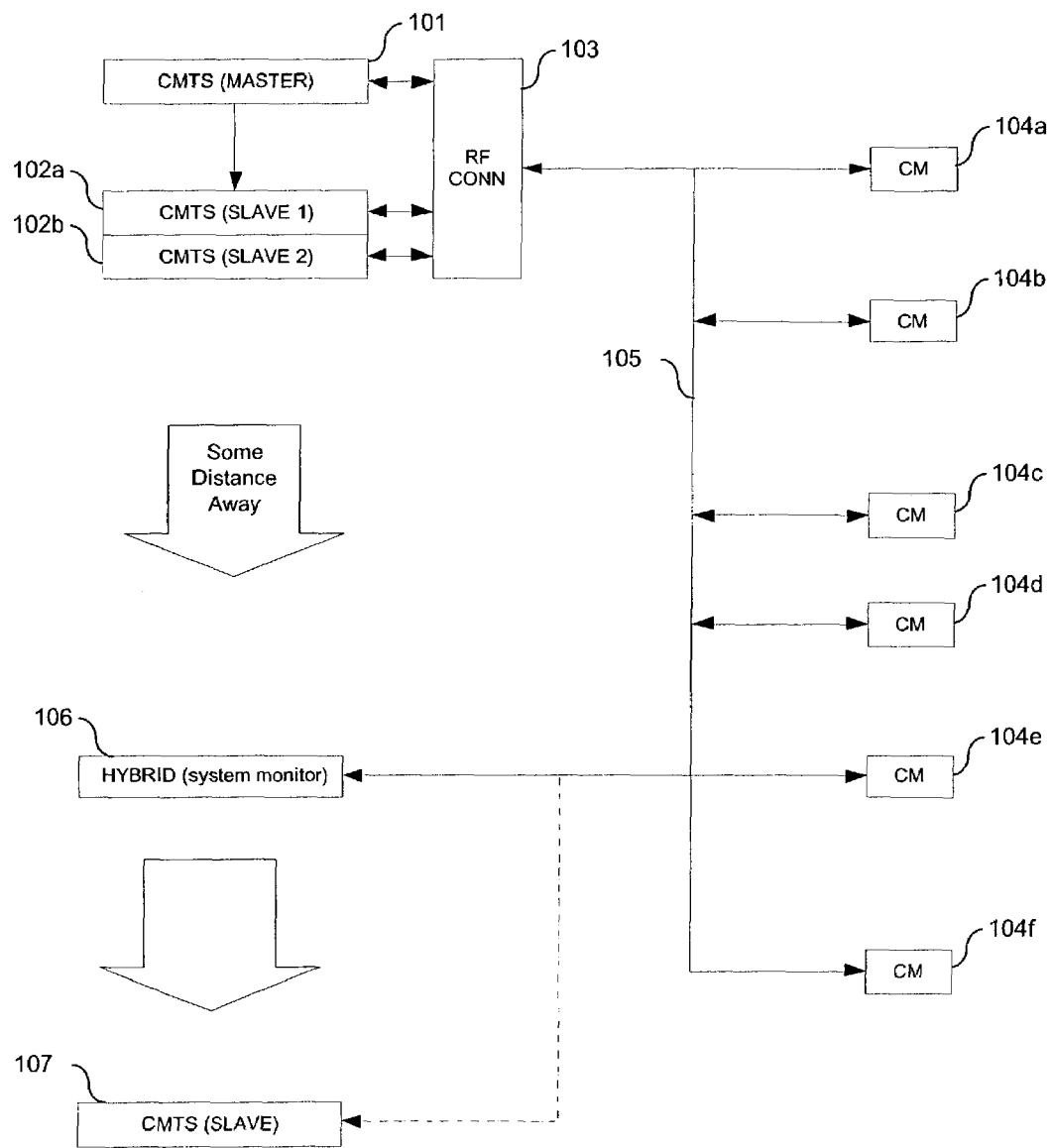
FIG. 1 illustrates a block diagram of a cable modem communications system.

Reference will now be made in detail to the preferred embodiments of the present invention, examples of which are illustrated in the accompanying drawings.

The system analyzer of the present invention may be a fully operational stand alone system that is also capable of operating as a fully functional DOCSIS 2.0 CMTS.

It can provide ranging and registering signaling for the DOCSIS 2.0 CM's on its plant, timing and synchronization for multiple (for example, dual) upstream channels conforming to the DOCSIS 2.0 SCDMA format and all the necessary maintenance signaling for providing continuous cable modem service using ATDMA (Advanced Time Division Multiple Access)/SCDMA. In addition to the support and supervisory node functions, the system can detect and parse downstream and upstream messages from another CMTS operating without any knowledge of the system's presence on the line. This system functions as a monitor that can parse UCD (upstream channel descriptor) and UCD2 messages, MAP's, TimeStamps, TimeStamp snapshots and record in memory all PDU's in the system memory for processing "off-line" or anytime such processing is desired. The monitoring functions of the system can synchronize the monitoring system to the CMTS that is controlling the signal path, without alerting the CMTS to its presence or requiring intervention from the CMTS. It can then enable the monitoring system to capture upstream bursts conforming to the SCDMA/ATDMA standard. There is currently no SCDMA monitoring system that can use the timing and control signaling communication between a CMTS and CM to self-synchronize itself to that system. Once self-synchronized to the CMTS-CM's present, the monitor can then analyze upstream bursts which are destined for reception by the CMTS only. The system can also be a fully functioning headend, while performing monitoring tasks.

One embodiment of the invention includes a MAC (Media Access Controller) chip, a QAM (Quadrature Amplitude Modulation) modulator, a QAM demodulator and a burst receiver chip, a dual core Si-Byte™ processor, a Xilinx™ high density FPGA (Field Programmable Gate Array) and an ACE (Active Computing Element) programming interface. The system includes a plurality of software—hardware interfaces, many of which share core processing resources and in some cases are interchangeable. For example, many mathematical functions can be done via processor execution of compiled C++ code. These same functions can be ported into hardware to accelerate the computations and reduce load on the software processor resources. Some of the functions are:

"Monitor and Range Process"—The function of listening to downstream UCD messages and upstream ranging responses in order to compute offsets required to "center" the monitoring device at the proper "propagation-time-location" relative to the CMTS and CM from which the communications have come from. The system also has an ability to range CM's that are located downstream from the system, (and an ability to range CM's between the system and CMTS.)

"Soft-PHY co-processor"—The functions of having a flexible boundary between hardware and software functions such that they are interchangeable and re-configurable for the purpose of data path processing. The system architecture allows the processing time (software loading) to be reduced and improved as the product is manufactured and deployed in the field. This operation may be implemented by calls to functions via PCI-DMA (direct memory access) transactions. Calls to hardware functions are made via DMA to different locations than calls to software DSP functions. In this way, the system can be easily programmed to access functions differently as they become available. This also applies to data crossing the PCI bus to implement a soft data-process, hard MAC data flow system, with upgrade features.

Dual Processor Architecture—CMTS functions are implemented using one partition and DSP functions using another.

Dual Function CMTS Monitor—The system is a fully functional CMTS while being able to simultaneously "listen" to another CMTS mastering the system timing. In this way, the monitor can be "slaved" to the master CMTS without any physical (i.e., wired) connection other than the physical plant coaxial cable.

Time Synchronization of Slave to Master using UCD and SYNC Message monitoring: commonly assigned patent application Ser. Nos. 09/653,155 and 06/235,008 disclose synchronization of multiple CMTS's using a physical wired connection and a software-controlled self-loading register, respectively, and are incorporated by reference herein. This allows for slave CMTS synchronization of the monitoring system using the UCD type 2 1messages and SYNC type messages contained in the DOCSIS data stream.

Self-Stimulation Mode—The system can provide a canned burst of data (programmable) on an RF upstream channel fully encoded using SCDMA formats. This burst is used to provide calibration (interpolation, offset) data to the CMTS that allows for upstream channel parameters to be determined empirically. This function will be useful in the absence of "known" channel parameters.

Real Time System—The system operates in real time, however has visibility into soft functions (math, parsing) as well as allowing for data to be processed in any order or at any time. All data is marked with arrival time embedded and can be re-ordered or processed as desired (filtered, re-sent, etc).

Virtual Machine—The system can be placed anywhere on the cable plant. Currently, the, system is designed to "learn" its location relative to a CMTS and CM's that it is located between. The system can also "learn" its location relative to CM's that are located between itself and the CMTS.

The system can monitor upstream SCDMA bursts while not being a supervisory provisioning node on the same plant that controls the CM SCDMA bursts. In addition, the system allows for a slave CMTS to synchronize to other master CMTS' that are located very far away.

The advantage of the invention is in being able to monitor SCDMA upstream and downstream data for the purpose of establishing whether or not the system is conforming to proper SCDMA formats per the DOCSIS 2.x standard. The system is fully programmable and configurable and can be upgraded in functionality to apply to future DOCSIS standard additions.

FIG. 1 illustrates an example of a cable modem system of the present invention. As shown in FIG. 1, a cable modem termination system (CMTS) 101 functions as a headend at the cable plant. The cable plant can also have a number of slave CMTS's 102a, 102b. The master and slave CMTS's 101, 102a, 102b have RF connections 103 to connect to the coax or fiberoptic cables 105. Downstream of the CMTS 101 are the cable modems (CM's) 104a, 104b . . . 104f. The cable modems 104a-104f communicate with the CMTS 101 in a bidirectional manner, for example, using a DOCSIS protocol. The bidirectional communication may be in any number of formats and modulation schemes, including SCDMA, ATDMA, QAM, QPSK (Quadrature Phase Shift Key), etc. The network monitor 106 is positioned as a third party to the bidirectional traffic on the cable 105, such that neither the CMTS 101 nor the cable modems 104 need to be aware of its presence. Alternatively, the network monitor of the present invention may function as a slave CMTS 107, as shown on FIG. 1. The slave CMTS 107 includes the necessary hardware, contained in a hybrid system to provide the necessary time generation counter (TGC) synchronization and SCDMA system timing synchronization based on only downstream and ethernet traffic. In other words, no physical timing interface (hardwire, bits etc.) would be required at the distant location. The slave CMTS 107 could be remotely located anywhere on a plant to perform CMTS headend functions specific to that location or district, without being known by the Master CMTS (unless desired).

Figure 2:
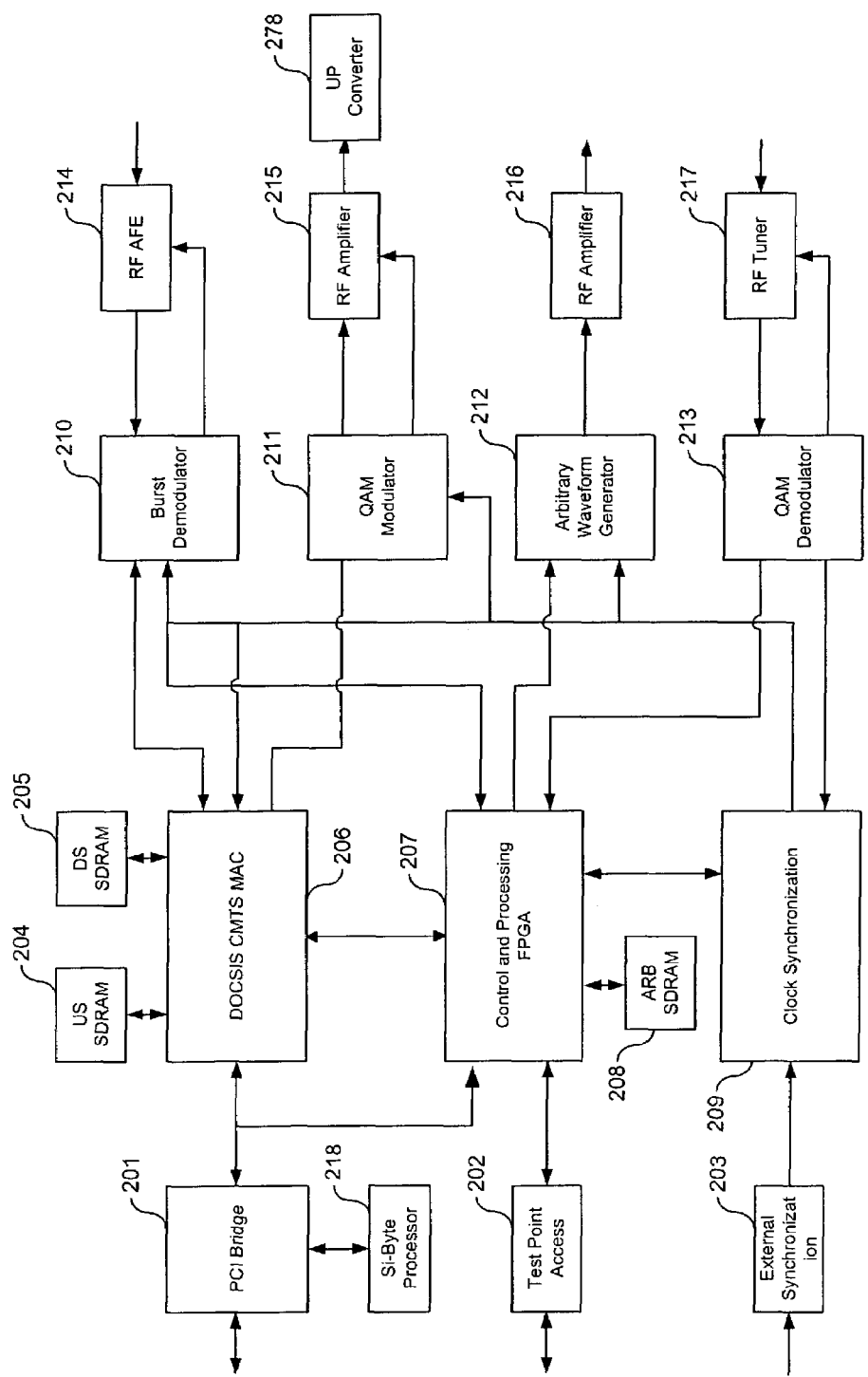
FIG. 2 illustrates a block diagram of one embodiment of the present invention.

FIG. 2 shows an example of one embodiment of the network monitor 106 of the present invention. As shown on FIG. 2, the network monitor 106 includes a PCI bridge 201, which is a data interface to the software domain, for example, to a laptop computer that a technician in the field might have, to software programs that may be downloaded into the network monitor 106, to any additional memory that may be used to store and/or record the data, any other peripheral storage and/or display devices, etc.

PCI bridge 201 also includes a bidirectional interface to a Si-Byte™ processor 218. The Si-Byte™ processor 218 functions as a system CPU, and includes a dual MIPS™-based processor, large shared memory, 3 Ethernet ports, an interface to the PCI, and other miscellaneous interfaces. One processor core is used to perform the CMTS function. The other processor core is used to perform a soft upstream burst demodulator function.

The PCI bridge 201 also includes a bidirectional interface to a DOCSIS CMTS media access control (MAC) 206 and to a control and processing FPGA (field programmable gate array) 207.

The CMTS function of the network monitor 106 includes several different system processing functions. This includes DOCSIS management (ranging, registration, etc), packet processing (performing a half bridge and potential routing functions), and overall system management (system health, configuration, etc).

The network monitor 106 includes Test Point Access 202 to provide a capability for a Test Interface to the network monitor 106. It may also be referred to as a Diagnostic Port Interface, or Monitor Port.

The soft upstream burst demodulation is used to recover data in the cable upstream and convert the RF data into data that can be used. The processor 218 is assisted by an FPGA 207 and associated hardware to collect and do some processing functions. The processing functions may be split between the two processing elements (the FPGA 207 and the processor card 218), but can be shifted completely to hardware (FPGA or ASIC). The second processor will then perform as a packet processing engine.

The FPGA 207 includes the control logic used to run the network analyzer 106. It also includes a bidirectional interface to the media access controller (MAC) 206. The media access controller is a standard MAC such as that found in cable modem systems. The FPGA 207 includes core function implementation, such as DSP functions, hardware controller, and soft interface controller, as discussed below.

The MAC 206 also includes a bidirectional interface to an upstream SDRAM 204 and another bidirectional interface to a downstream SDRAM 205. Each provides a capability of a data storage module, with the ability to store traffic for post process staging interface. The upstream SDRAM 204 is normally used for storage of such information as encryption keys, data used for maintenance operations, data used for formatting operations, etc. The downstream SDRAM 205 is used to store such information as PDU (packet) data, bandwidth allocation map data, overflows from FIFO's, etc.

The network monitor 106 includes an external synchronization block 203, which can receive a clock signal from an external source, such as a 163.84 MHz clock commonly used in many DOCSIS systems. The external synchronization block 203 may be referred to as a slave time base synchronizer, a time reference calibrator, or a slave time base controller.

The network analyzer 106 also includes a clock synchronization block 209, which includes phase lock loops, and provides phase coherent clocks by which all the MAC and PHY processing hardware time its operations. It provides a 163.84 MHz clock to a burst demodulator 210, and an 81.92 MHz clock to the FPGA 207. The clock synchronization block 209 may be referred to generically as a time synchronizer, a master clock controller, a master time base reference, or a master time base source.

The FPGA 207 also includes a bidirectional bus to a waveform SDRAM (ARB SDRAM) 208, and to an arbitrary waveform generator 212. The ARB SDRAM is essentially a memory that functions as waveform storage unit. It may also be referred to as a coefficient storage unit, or a channel parameter storage unit.

The arbitrary waveform generator 212 can generate a digital waveform based on samples and/or coefficients received from the FPGA 207. To generate such a waveform, the FPGA 207 loads the waveform coefficients/samples from the ARB SDRAM 208, and downloads them to the arbitrary waveform generator 212. The arbitrary waveform generator 212 then outputs the waveform to an RF amplifier 216 (which is a line driver for a cable modem system, and may be referred to more generically as a gain increase block, optical amplifier, or a data launcher), and then out to the cable 105. The waveform generator 212 functions as DSP waveform generator, or a "canned waveform launcher," such that it is a calibration stimulus block for the system, with the capability to launch a waveform into the cable plant, so that the waveform is received back and channel characteristics and offsets can be determined.

The network monitor 106 also includes the burst demodulator 210, which is connected to an RF analog front end (AFE) 214.

The analog front end 214 receives a signal from the cable 105. The analog front end 214 includes digital and analog filters necessary to preprocess the RF signal. After the preprocessing, the analog front end 214 outputs a digital signal to the burst demodulator 210. The burst demodulator 210 has the capability to process any of DOCSIS supported modulation schemes and data formats, including SCDMA, TDMA, ATDMA, CDMA, as well as M-QAM and QPSK data formats. The burst demodulator 210 is connected by a bidirectional bus to the MAC controller 206 and to the FPGA 207. The burst demodulator 210 can output baseband data, as well as the individual in phase and quadrature (I and Q) components to the FPGA 207 for processing.

The network monitor 106 includes a QAM modulator 211. The QAM modulator 211 is connected to an RF amplifier (line driver) 215, which in turn is connected to the cable 105. The QAM modulator, upon command from the MAC controller 206 and the FPGA 207 can output data onto the cable 105 in the desired data format and modulation scheme. Thus, the QAM modulator 211 takes baseband DOCSIS data and modulates it up to the IF frequency for input into an RF UP converter 278. The RF UP converter 278 converts the IF frequency input to the RF frequency that is output onto the cable 105. The QAM modulator also performs the functions of a QPSK modulator, and may be referred to more generically as an optical modulator, a data modulator, or an encoded modulator.

The network analyzer 106 also includes a QAM demodulator 213, which is connected to an RF tuner 217. The RF tuner 217 may be referred to as a channel decoder, a channel selector, an optical tuner (for optical channels), or an optical de-multiplexor.

The QAM demodulator 213 takes a downstream signal from the CMTS 101, and demodulates it so as to triangulate the position of the network monitor 106. Thus, by listening to the bidirectional traffic on the cable 105, the network monitor 106 can compute its own location relative to the other participants in the two-way communications traffic (i.e., the cable modems 104 and the CMTS 101).

The arbitrary waveform generator 212 creates a "canned" waveform for purposes of calibration. With the use of a canned waveform from the waveform generator 212 the network monitor 106 can run a waveform through a cable plant, and calibrate proper settings for receiving it. Thus, the canned waveform can function as a fixed test signal, which can be used for self-calibration. After the self-calibration, the network monitor 112 is calibrated to receive other bursts from the cable modems and the CMTS 101.

The network monitor 106 can listen to correction messages from the CMTS 101 and the messages from the cable modems 104. With self-triggering, it can compute its own offset, so that it knows when to listen to within one nanosecond accuracy. It also knows "how" to listen, i.e., which modulation scheme and which data format is used by the participants in the bidirectional communications traffic on the cable 105. Thus, the network monitor can function as a "third party" to the communications, such that neither the cable modem 104 nor the CMTS 101 needs to be aware of its presence.

The network monitor 106 includes the monitoring functions of a supervisory node of a DOCSIS system, without itself being a supervisory node. The network monitor 106 is able to compute its offset (i.e., to range itself, or determine the distance to both the cable modem 104 and the CMTS 101) by listening to the cable modem 104 and the CMTS 101, and particularly to the offsets (ranging information) transmitted by the CMTS 101. Thus, it is able to determine its own distance to the CMTS 101 and the cable modem 104.

Figure 3:
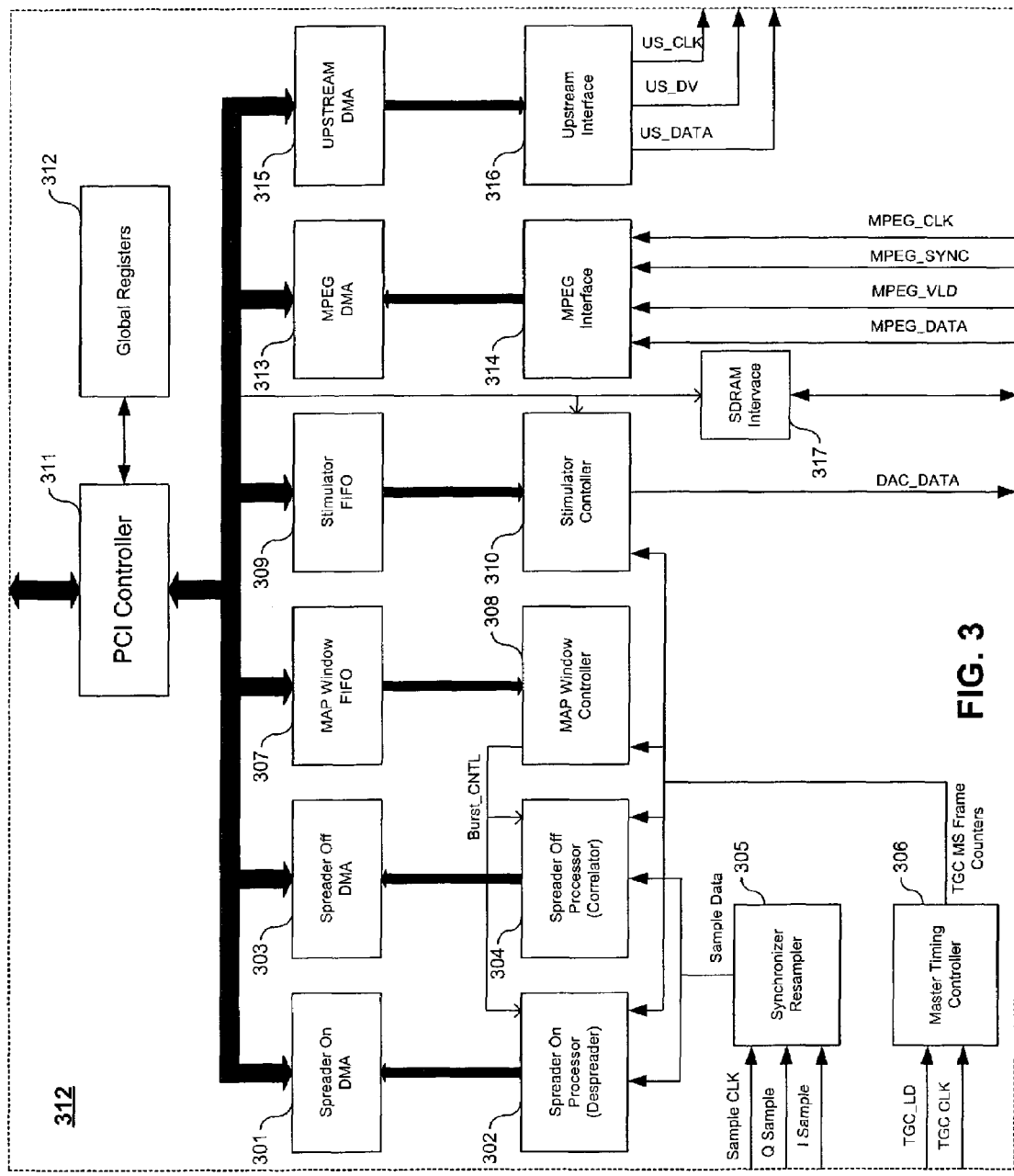
FIG. 3 illustrates a block diagram of an FPGA used in the present invention.
Figure 4:
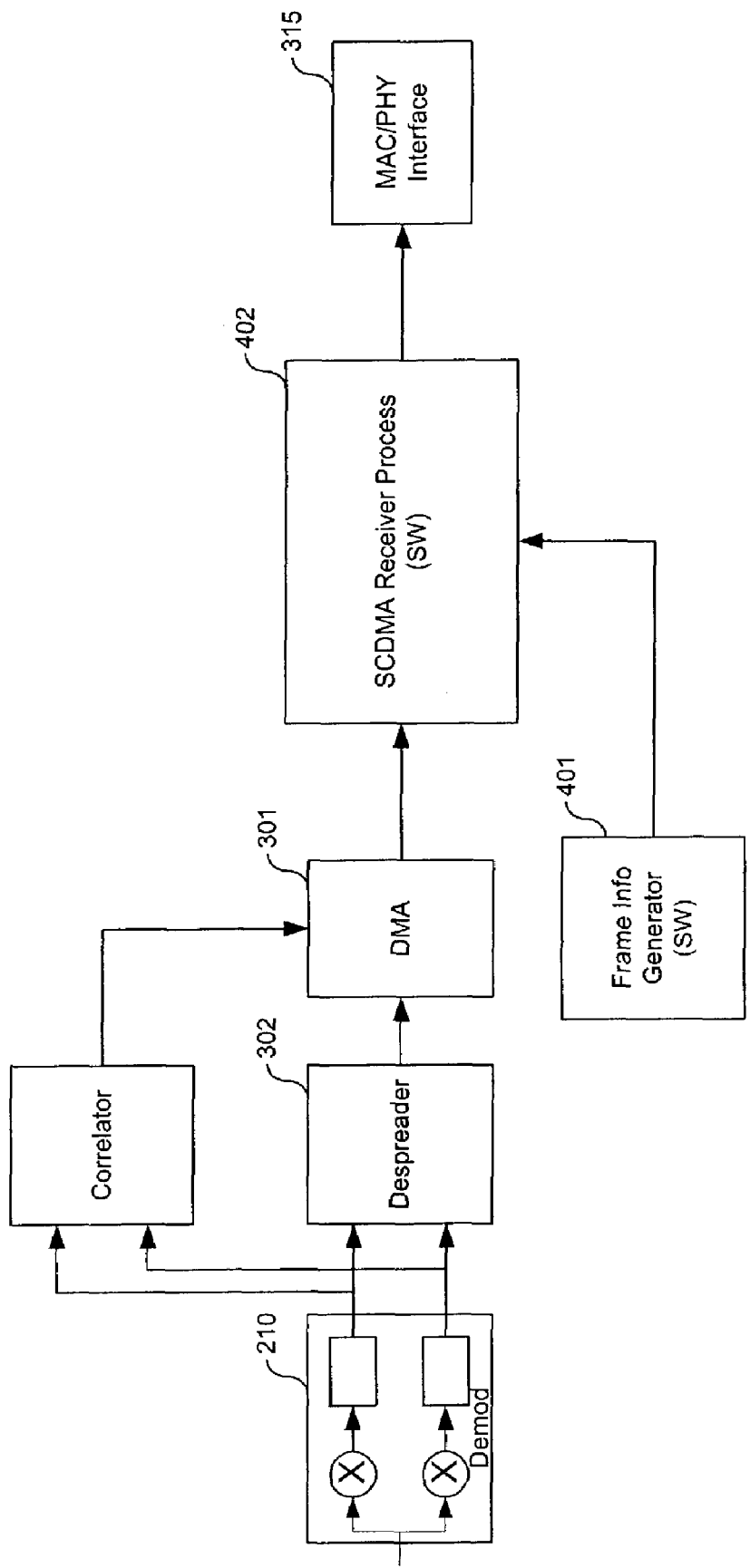
FIG. 4 illustrates an SCDMA receiver architecture.

Further, with reference to FIGS. 3 and 4, the FPGA 207 includes the following functions:

DEMOD 210: Received RF signal is demodulated and filtered to produce the base band I and Q data sampled at 4× symbol rate.

A CORRELATOR 304: A correlator is used to detect the presence of a Preamble during initial ranging. It also determines the best symbol sample position for passing the I and Q symbols to the SCDMA Receiver Process 402. The correlator 304 may be implemented in the FPGA 207.

DESPREADER 302: the despreader 302 de-spreads the received I and Q symbols. This is required when spreader on mode is used. This function is currently implemented in FPGA 207.

DMA 301, 303: Direct Memory Access (DMA) provides a fast way of passing the data from the FPGA to the SCDMA Receiver Process 402 (implemented in software). The Receiver Process is a software implementation using Si-byte Processor 218.

FRAME INFO GENERATOR 401: The SCDMA Receiver Process is performed one frame at a time, unless it is a spreader off mode where a complete burst is process at a time. The Frame Info Generator (implemented in software) provides information to the receiver on the frame it is about to process. The information include spreader mode, number of burst in the frame, preamble length, data payload length, start and end of the frame, burst profile number, etc.

SPREADER OFF PREAMBLE PROCESS (INITIAL RANGING): During initial ranging spreader off mode is used. This function estimates the carrier frequency offset, carrier phase offset, Gain, and sample timing offset.

SPREADER ON PREAMBLE PROCESS: Similar to spreader off preamble process, this function also estimates the Gain and carrier frequency and phase offsets.

SPREADER ON PROCESS: Again this function is similar to the above preamble on process, however, the different is that in this case there is no preamble presence.

DEROTATOR: The estimated carrier frequency and phase offsets are use in this function to derotate the I and Q symbols in the frame.

DEFRAMER: The deframer reconstructs the ordering of data to the original form as prior to framing in the transmitter. Locations of coded and uncoded symbols are recorded for Viterbi decoder to be used later.

VITERBI DECODER: This function performs the Trellis Coded Modulation (TCM) decoding. Based on the information given by the deframer on the locations of coded and uncoded symbols, output data is reconstructed to reflect the original form.

DESCRAMBLER: The decoded data are then descrambled by this function.

RS DECODER: The descrambled data are then passed to a Reed Solomon Decoder to possibly correct some received data error.

STIMULATOR 310: The basic premise of the stimulator block is to provide a means for creating, formatting and transmitting modulated data on a DOCSIS 2.0 modulated system or plant. The stimulator block is implemented in the Processing and Control FPGA (Field Programmable Gate Array) 207 within the DOCSIS 2.0 CMTS and Monitoring System. The interfaces include:

1. Internal DMA Block—This block allows software to transfer blocks of data across the PCI interface into the Stimulator memory, which consists of 64MB of SDRAM. The transferred data is formatted in 14 bit raw sample values, which are fetched out of memory and forwarded to an external DAC device.

2. Control Interface—This interface consists of three control signals (Preload, Go, and Block Type) for the Stimulator Block, which are controlled by the internal Map Window Generator Block, and is used for timing and initiating data transfers from the stimulator memory to an external DAC device. The Preload is used to begin fetching data from memory (as declared by the Block Type signaling) and store into a FIFO to queue up for forwarding to the DAC on a precisely synchronized and controlled boundary. The Go is used to begin the data transfer out of the FIFO and forward to the 14 bit interface on the external DAC.

3. DAC Interface—This interface consists of the 14 bit data and clock interface to the DAC. The function of this interface relies on a Digital Signal Processing (DSP) algorithm in software which is capable of creating and processing data packets into a raw sample format which is utilized by the external DAC for RF modulating and transmitting the data onto a DOCSIS 2.0 system or plant.

This functionality is utilized for two purposes in the DOCSIS 2.0 CMTS and Monitoring System:

1. It allows pre-formatted data to be stored in Stimulator Memory and utilized within a calibration and diagnostic process for self checking functionality.

2. It allows the system the flexibility to receive and process incoming data and then utilize the software DSP algorithm to format a data response and DMA the data block into the Stimulator Memory for transmission onto the plant through the external DAC interface.

The network monitor 106 is able to monitor the bidirectional traffic on the cable 105, so as to determine which standard is being used for communication, and whether the bidirectional communication is in compliance with the DOCSIS standard, particularly DOCSIS 2.0. It is able to listen to the bidirectional traffic without the normal ranging/registering procedures required for conventional CM/CMTS bidirectional communication. The network monitor 106 is able to listen to any cable modem without participation of the CMTS 101, and without the knowledge of the CMTS 101.

It is able to do so without precalibration. The network monitor 106 is able to listen to the bidirectional traffic on the cable 105, in particular, to the registering/ranging information being exchanged between the CMTS 101 and the cable modem 104.

It is also able to itself function as a CMTS, which is particularly useful in the field. Thus, with the network monitor 106 of the present invention, a technician can set up a "portable" headend in the field, which is particularly useful for testing and diagnostic purposes. The network monitor 106 can also synchronize itself to a CMTS that is any arbitrary distance away, for example, to another network monitor 106 that is in the field, or to a conventional CMTS 101. It is auto-synchronizing, i.e., it does not need to be told what the clock information is. Rather, it is able to auto-lock itself to the clock used by the cable modem, by listening to the registering communications between the cable modem 104 and the CMTS 101. The network monitor 106 can make the same correction as told by the CMTS 101 to the cable modem 104 during the ranging process, and can add its own additional offset, as required.

The network monitor 106 can record the data from the network, and store it for later use. It can analyze the data to make sure that it can perform diagnostics on the data to confirm whether or not the bidirectional traffic conforms to a particular standard (e.g., DOCSIS 2.0). It can display the recorded data on a CRT, or store it to a file. The type of data displayed or stored can include type of messages being exchanged, error types, noise relative to location, etc. The network monitor 106 can also display such data by subscriber ID. It can verify data destined for the CMTS 101. The network monitor 106 can listen to and record traffic in both directions (upstream and downstream) without being registered on the network.

The network monitor code includes code to configure the RF tuner and the QAM demodulator 213 to tune and acquire downstream lock of the QAM signal. Once QAM lock is obtained, the downstream QAM core is initialized to initiate the flow of data packets to the downstream monitor buffer descriptor (BD) ring. A polling loop can check the BD ring to determine if any packets have arrived. Once it is determined that a packet has arrived, it is pulled from the ring and queued for delivery to the packet processing thread "TriageThread". The "TriageThread" checks to see if the packet is a MAC management message and if so, what type it is.

If the message is a MAC management message and its type is UCD, two further checks are performed: one to determine if the upstream channel in the UCD matches the channel of interest (set by user input) and the other to determine if the change count of the UCD has changed. If the UCD change count is different and the channel matches, the software programs upstream parameters and programs the FPGA 207 to prepare for SCDMA burst capture.

If the message is a MAC management message, its type is MAP and the channel in the message matches the upstream channel of interest, additional processing to setup the mapping/scheduling software to anticipate SCDMA transmissions at the proper times is performed.

A TDMA scheduling routine can be modified to create a frame-aware SCDMA scheduler. SCDMA frame boundaries and switching between the types of SCDMA traffic, spreader on and spreader off, add complexity to the scheduler that do not exist in TDMA systems. The FPGA 207 provides snapshot registers of the three relevant SCDMA system counters, ticks, minislots and frames. Each time a grant is to be allocated, the scheduler calculates the next frame boundary from the three counters and the current minislot to be mapped. Subsequent minislots, if any, are mapped to NULL, and the grant is mapped at the frame boundary. All time is mapped and every non-NULL grant begins on a frame boundary, successfully mitigating the SCDMA requirements while maintaining compliance.

The "syneCounters" function initializes network monitor 106 SCDMA frame registers and synchronizes them with the 10.24 Mhz CMTS timestamp counter. The frame registers "FrameSizeReg", "MinislotsPerFrameReg", and "MinislotSizeReg" are initialized using configuration parameters 1) the number of spreading intervals per frame (Ks), 2) the symbol modulation rate (BaudRate, where 0=5.12 Mhz, 1=2.56 Mhz, 2=1.28 Mhz), 3) the codes per minislot (Cms), and 4) the number of active codes (P). The registers are initialized as:

FrameSizeReg=2*128*Ks*(2**BaudRate)
MinislotsPerFrameReg=P/Cms
MinislotSizeReg=2*Cms*Ks*(2**BaudRate)

Synchronization begins with a reading of the CMTS timestamp counter (tgcCurr), immediately followed by initialization of snapshot frame registers "FrameSnapReg", "MinislotSnapReg", and "TGCSnapReg" as:

FrameSnapReg=0xFE;
MinislotSnapReg=(P*(tgccurr−(tgcCurr Modulo FrameSizeReg)))/(128*MinislotSizeReg)+(5*MinislotsPerFrameReg);
TGCSnapReg=tgcCurr−(tgcCurr Modulo FrameSizeReg)+(5*FrameSizeReg);

The network monitor 106 TGC snapshot control register is initialized to accept an external synchronization pulse from the CMTS, and the CMTS TGC control register is configured to trigger an external pulse at CMTS time (TGCSnapReg−2), where 2 is the transmission time between the CMTS and Network monitor 106 hardware. When the CMTS timestamp counter reaches (TGCSnapReg−2), the CMTS triggers an external pulse, causing Network monitor 106 to initialize its FrameCounter, MinislotCounter, and TGCCounter registers with the values in the snapshot registers. Note that the initial frame count has no significance at synchronization time, and that synchronization will occur approximately 5 frames beyond the initial timestamp reading.

It will be appreciated that the various receivers and transmitters that are shown as separate blocks in the block diagram of FIG. 2 can be combined into a single chip. For example, the burst receiver 210 and the QAM demodulator 213 can be combined into a single receiver. Similarly, the analog front end functions may be integrated into the receiver. The Si-Byte processor 218 and the FPGA 207 can also be combined into a single processor, or CPU. The waveform generator 212 can also be integrated into the CPU.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A network monitor comprising:
   means for monitoring downstream traffic from a cable modem termination system (CMTS) to a cable modem (CM);
   means for monitoring upstream traffic from the CM to the CMTS;
   means for identifying a data format used by the CMTS and the CM for bi-directional communication;
   means for monitoring bi-directional communication; and
   means for calculating offsets from the CMTS and the CM.

2. The network monitor of claim 1, wherein the means for monitoring includes a burst demodulator.

3. The network monitor of claim 1, wherein the means for monitoring downstream traffic includes a QAM demodulator.

4. The network monitor of claim 1, further including:
   means for receiving a calibration waveform; and
   means for calculating offsets based on the calibration waveform received by the means for receiving the calibration waveform.

5. The network monitor of claim 3, further including means for calculating an additional offset after calculating offsets from the CMTS and the CM.

6. The network monitor of claim 1, further including means for monitoring registration information being exchanged between the CMTS and the CM.

7. The network monitor of claim 1, further including means for monitoring offset information provided by the CMTS to the CM.

8. The network monitor of claim 1, further including means for storing the upstream and downstream traffic.

9. The network monitor of claim 1, further including means for displaying information about the upstream and downstream traffic.

10. The network monitor of claim 1, further including means for verifying whether the upstream and downstream traffic conforms to the DOCSIS standard.

11. The network monitor of claim 1, further including a media access controller connected to the means for monitoring downstream traffic, the means for monitoring upstream traffic and the means for identifying a data format.

12. The network monitor of claim 1, wherein the data format is M-QAM.

13. The network monitor of claim 1, wherein the data format is QPSK.

14. The network monitor of claim 1, wherein the upstream and downstream traffic is modulated in accordance with an SCDMA modulation scheme.

15. The network monitor of claim 1, wherein the upstream and downstream traffic is modulated in accordance with an ATDMA modulation scheme.

16. The network monitor of claim 1, wherein the upstream and downstream traffic is modulated in accordance with a TDMA modulation scheme.

17. The network monitor of claim 1, wherein the upstream and downstream traffic is modulated in accordance with an FDMA modulation scheme.

18. The network monitor of claim 1, wherein the network monitor functions as a supervisory node without registering with the CMTS.

19. The network monitor of claim 1, wherein the network monitor monitors the upstream and downstream traffic without registering with the CMTS.

20. A network analyzer comprising:
means for monitoring downstream traffic from a headend to a modem;
means for monitoring upstream traffic from the modem to the headend;
means for identifying a data format used by the headend and the modem for bi-directional communication; and
means for calculating offsets from the headend and the modem.

21. The network analyzer of claim 20, wherein the means for monitoring the upstream traffic includes a burst demodulator.

22. The network analyzer of claim 20, wherein the means for monitoring downstream traffic includes a QAM demodulator.

23. The network analyzer of claim 22, further including:
means for receiving a calibration waveform; and
means for calculating offsets based on the calibration waveform received by the means for receiving the calibration waveform.

24. The network analyzer of claim 23, further including means for calculating an additional offset after calculating offsets from the headend and the modem.

25. The network analyzer of claim 22, further including means for monitoring registration information being exchanged between the headend and the modem.

26. The network analyzer of claim 22, further including means for monitoring offset information provided by the headend to the modem.

27. The network analyzer of claim 22, further including means for storing the upstream and downstream traffic.

28. The network analyzer of claim 22, further including means for displaying information about the upstream and downstream traffic.

29. The network analyzer of claim 22, further including means for verifying whether the upstream and downstream traffic conforms to the DOCSIS standard.

30. The network analyzer of claim 22, further including a media access controller connected to the means for monitoring downstream traffic, the means for monitoring upstream traffic and the means for identifying a data format.

31. The network analyzer of claim 20, wherein the data format is M-QAM.

32. The network analyzer of claim 20, wherein the data format is QPSK.

33. The network analyzer of claim 20, wherein the upstream and downstream traffic is modulated in accordance with an SCDMA modulation scheme.

34. The network analyzer of claim 20, wherein the upstream and downstream traffic is modulated in accordance with an ATDMA modulation scheme.

35. The network analyzer of claim 20, wherein the upstream and downstream traffic is modulated in accordance with a TDMA modulation scheme.

36. The network analyzer of claim 20, wherein the upstream and downstream traffic is modulated in accordance with an EDMA modulation scheme.

37. The network analyzer of claim 20, wherein the network analyzer functions as a supervisory node without registering with the headend.

38. The network analyzer of claim 20, wherein the network analyzer monitors the upstream and downstream traffic without registering with the headend.

39. A network monitor comprising:
a controller;
a media access controller (MAC) connected to the controller;
a burst demodulator that receives upstream communications from a cable modem and outputs digital data to the controller and to the MAC; and
a QAM demodulator that receives downstream communications from a headend,
wherein the controller ranges the network monitor without registering with the headend.

40. The network monitor of claim 39, further including upstream random access memory connected to the MAC.

41. The network monitor of claim 39, further including downstream random access memory connected to the MAC.

42. The network monitor of claim 39, wherein the controller is a field programmable gate array.

43. The network monitor of claim 39, further including a waveform generator.

44. The network monitor of claim 43, further including a memory storing coefficients for use by the waveform generator to generate a waveform.

45. The network monitor of claim 43, wherein the waveform generator can launch a predetermined waveform such that the controller can calculate its offset from the headend.

46. The network monitor of claim 45, wherein the offset is calculated to within 1 nanosecond.

47. The network monitor of claim 39, wherein the controller monitors registration information being exchanged between the headend and the modem.

48. The network monitor of claim 39, wherein the controller monitors offset information provided by the headend to the modem.

49. The network monitor of claim 39, further including a PCI bridge that connects to an external software source.

50. The network monitor of claim 39, further including a PCI bridge that connects to an external display.

51. The network monitor of claim 50, wherein the controller can display information about the upstream and downstream traffic on the external display through the PCI bridge.

52. The network monitor of claim 39, further including a PCI bridge that connects to an external memory for storing any one of the upstream communications and the downstream communications.

53. The network monitor of 39, wherein the controller can verify whether any one of the upstream communications and the downstream communications conforms to the DOCSIS standard.

54. The network monitor of 39, wherein the controller can identify a data format of any one of the upstream communications and the downstream communications datastream.

55. The network monitor of 39, wherein any one of the upstream communications and the downstream communications datastream is M-QAM.

56. The network monitor of 39, wherein any one of the upstream communications and the downstream communications is QPSK.

57. The network monitor of 39, wherein any one of the upstream communications and the downstream communications is in accordance with an SCDMA modulation scheme.

58. The network monitor of 39, wherein any one of the upstream communications and the downstream communications is in accordance with an ATDMA modulation scheme.

59. The network monitor of 39, wherein any one of the upstream communications and the downstream communications is in accordance with a TDMA modulation scheme.

60. The network monitor of 39, wherein any one of the upstream communications and the downstream communications is in accordance with an FDMA modulation scheme.

61. The network monitor of 39, wherein the network monitor functions as a supervisory node without registering with the headend.

62. The network monitor of 39, wherein the network monitor monitors the upstream and downstream communications without registering with the headend.

63. The network monitor of 39, wherein the burst demodulator outputs baseband data to the controller.

64. The network monitor of 39, wherein the burst demodulator outputs I and Q components of the upstream communication to the controller.

65. The network monitor of 39, wherein the network monitor can function as a slave CMTS.

66. A cable traffic verification system comprising:
a controller;
a media access controller (MAC) connected to the controller; and
a receiver that receives a data stream and outputs digital data to the controller and to the MAC,
wherein the controller performs ranging based on the digital data without registering with a headend.

67. A network monitor comprising:
a master control unit;
a media access controller (MAC) connected to the master control unit;
a burst receiver that receives bursts from a modem and outputs digital data to the master control unit and to the MAC; and
a QAM demodulator that receives downstream traffic from a headend and outputs digital downstream traffic to the master control unit,
wherein the master control unit performs ranging based on the digital data and the digital downstream traffic.

68. A network analyzer comprising:
a central processing unit;
a receiver that receives analog upstream traffic and outputs digital upstream traffic to the central processing unit; and
a demodulator that receives analog downstream traffic and outputs digital downstream traffic to the central processing unit,
wherein the network analyzer listens to the analog upstream traffic and the analog downstream traffic without other network participants being aware of its presence.

69. A slave CMTS comprising:
a processor;
a media access controller (MAC) connected to the processor;
a receiver that receives analog upstream traffic and outputs digital upstream traffic to the processor and to the MAC;
a demodulator that receives analog downstream traffic and outputs digital downstream traffic to processor; and
a transmitter that transmits modulated data to a network.

70. A network analyzer comprising:
a central processing unit;
a receiver that receives analog upstream traffic and outputs digital upstream traffic to the central processing unit; and
a demodulator that receives analog downstream traffic and outputs digital downstream traffic to the central processing unit,
wherein the central processing unit identifies registration information transmitted between a headend and a modem without registering with the headend.

71. A network analyzer comprising:
a central processing unit;
a media access controller (MAC) connected to the central processing unit;
a receiver that receives analog upstream traffic and outputs digital upstream traffic to the central processing unit and to the MAC; and
a demodulator that receives analog downstream traffic and outputs digital downstream traffic to the central processing unit,
wherein the network analyzer can auto-range itself by launching a test transmission into the network.

72. A network analyzer comprising:
a central processing unit;
a media access controller (MAC) connected to the central processing unit;
a receiver that receives analog upstream traffic and outputs digital upstream traffic to the central processing unit and to the MAC; and
a demodulator that receives analog downstream traffic and outputs digital downstream traffic to the central processing unit,
wherein the network analyzer auto-locks to a clock used by a modem by monitoring the upstream traffic.

73. A network analyzer comprising:
a central processing unit;
a media access controller (MAC) connected to the central processing unit;
a receiver that receives analog upstream traffic and outputs digital upstream traffic to the central processing unit and to the MAC; and
a demodulator that receives analog downstream traffic and outputs digital downstream traffic to the central processing unit,
wherein the network analyzer auto-synchronizes to the analog upstream traffic.

74. A bi-directional communications traffic monitor comprising:
a system controller;

a burst receiver that receives analog upstream traffic and outputs digital upstream traffic to the system controller and to a MAC; and a demodulator that receives analog downstream traffic and outputs digital downstream traffic to the system controller, wherein the network monitor listens to the analog upstream traffic and the analog downstream traffic without other network participants being aware of its presence.

75. A method of monitoring network traffic comprising the steps of:

monitoring downstream traffic from a cable modem termination system (CMTS) to a cable modem (CM);

monitoring upstream traffic from the CM to the CMTS;

identifying a data format used by the CMTS and the CM for bi-directional communication; and calculating offsets from the CMTS and the CM.

76. A method of monitoring network traffic comprising the steps of:

receiving bi-directional traffic;

processing the bi-directional traffic to convert it to a digital signal; and ranging based on the digital signal without registering with a headend.

77. A method of monitoring cable modem network traffic comprising the steps of:

monitoring registering information exchanged between a modem and a headend;

identifying subscriber ID and ranging information transmitted by the headend; and calculating actual offsets to the headend and the modem based on the ranging information.

* * * * *

UNITED STATES PATENT AND TRADEMARK OFFICE
CERTIFICATE OF CORRECTION

PATENT NO. : 7,372,872 B2
APPLICATION NO. : 10/440502
DATED : May 13, 2008
INVENTOR(S) : Danzig et al.

It is certified that error appears in the above-identified patent and that said Letters Patent is hereby corrected as shown below:

Column 9
Line 60, please replace "tgccurr" with --TgcCurr--.

Column 12
Line 16, please replace "EDMA" with --FDMA--.
Line 36, please replace "The network monitor of 39," with --The network monitor of claim 39,--.
Line 38, please replace "The network monitor of 39," with --The network monitor of claim 39,--.
Line 40, please replace "The network monitor of 39," with --The network monitor of claim 39,--.
Line 50, please replace "The network monitor of 39," with --The network monitor of claim 39,--.
Line 53, please replace "The network monitor of 39," with --The network monitor of claim 39,--.
Line 56, please replace "The network monitor of 39," with --The network monitor of claim 39,--.
Line 58, please replace "The network monitor of 39," with --The network monitor of claim 39,--.
Line 64, please replace "The network monitor of 39," with --The network monitor of claim 39,--.

Column 13
Line 1, please replace "The network monitor of 39," with --The network monitor of claim 39,--.
Line 5, please replace "The network monitor of 39," with --The network monitor of claim 39,--.
Line 8, please replace "The network monitor of 39," with --The network monitor of claim 39,--.
Line 11, please replace "The network monitor of 39," with --The network monitor of claim 39,--.
Line 14, please replace "The network monitor of 39," with --The network monitor of claim 39,--.
Line 18, please replace "The network monitor of 39," with --The network monitor of claim 39,--.
Line 22, please replace "The network monitor of 39," with --The network monitor of claim 39,--.

UNITED STATES PATENT AND TRADEMARK OFFICE
CERTIFICATE OF CORRECTION

PATENT NO.       : 7,372,872 B2
APPLICATION NO.  : 10/440502
DATED            : May 13, 2008
INVENTOR(S)      : Danzig et al.

It is certified that error appears in the above-identified patent and that said Letters Patent is hereby corrected as shown below:

Column 13
Line 25, please replace "The network monitor of 39," with --The network monitor of claim 39,--.
Line 28, please replace "The network monitor of 39," with --The network monitor of claim 39,--.
Line 31, please replace "The network monitor of 39," with --The network monitor of claim 39,--.
Line 34, please replace "The network monitor of 39," with --The network monitor of claim 39,--.
Line 36, please replace "The network monitor of 39," with --The network monitor of claim 39,--.
Line 39, please replace "The network monitor of 39," with --The network monitor of claim 39,--.

Signed and Sealed this

Thirteenth Day of January, 2009

JON W. DUDAS
*Director of the United States Patent and Trademark Office*